(12) United States Patent
Tsubusaki

(10) Patent No.: US 11,265,478 B2
(45) Date of Patent: Mar. 1, 2022

(54) TRACKING APPARATUS AND CONTROL METHOD THEREOF, IMAGE CAPTURING APPARATUS, AND STORAGE MEDIUM

(71) Applicant: CANON KABUSHIKI KAISHA, Tokyo (JP)

(72) Inventor: Akihiro Tsubusaki, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/127,226

(22) Filed: Dec. 18, 2020

(65) Prior Publication Data

US 2021/0195113 A1 Jun. 24, 2021

(30) Foreign Application Priority Data

Dec. 20, 2019 (JP) .............................. JP2019-230627
Nov. 6, 2020 (JP) .............................. JP2020-186051

(51) Int. Cl.
    *H04N 5/232* (2006.01)
(52) U.S. Cl.
    CPC ..... *H04N 5/23299* (2018.08); *H04N 5/23264* (2013.01)
(58) Field of Classification Search
    CPC . H04N 5/23299; H04N 5/23264; H04N 5/232
    USPC .................................................... 348/207.99
    See application file for complete search history.

(56) References Cited

U.S. PATENT DOCUMENTS

| 6,055,014 A * | 4/2000 | Hosonuma ......... H04N 5/23299 348/143 |
| 9,041,814 B2 * | 5/2015 | Takashima ......... H04N 5/23299 348/169 |
| 9,165,364 B1 * | 10/2015 | Kishi ................... G06K 9/3241 |
| 9,692,962 B2 * | 6/2017 | Wakamatsu ....... H04N 5/23218 |
| 9,692,973 B2 * | 6/2017 | Haruna .............. H04N 5/23218 |
| 10,560,624 B2 * | 2/2020 | Oshima ............ H04N 5/232935 |
| 10,798,345 B2 * | 10/2020 | Numata ............. H04N 5/23299 |
| 2013/0120586 A1 * | 5/2013 | Takashima ......... H04N 5/23218 348/169 |
| 2015/0294176 A1 * | 10/2015 | Kishi ................... G06K 9/3241 348/169 |
| 2016/0316137 A1 * | 10/2016 | Wakamatsu ....... H04N 5/23219 |
| 2019/0132559 A1 * | 5/2019 | Numata ............. H04N 5/23296 |
| 2020/0228720 A1 * | 7/2020 | Shen ..................... H04N 5/225 |

FOREIGN PATENT DOCUMENTS

JP 2017-111430 A 6/2017

* cited by examiner

*Primary Examiner* — Pritham D Prabhakher
(74) *Attorney, Agent, or Firm* — Cowan, Liebowitz & Latman, P.C.

(57) ABSTRACT

A tracking apparatus comprises a detection unit that detects a subject in an image obtained by photoelectrically converting light entering through an imaging optical system with an image sensor, a tracking unit that tracks the subject in a plurality of predetermined directions, a determination unit that determines a tracking direction in which the subject is to be tracked among the plurality of directions, and a control unit that controls the tracking unit to perform tracking in the tracking direction and suppress tracking in a direction different from the tracking direction.

19 Claims, 12 Drawing Sheets

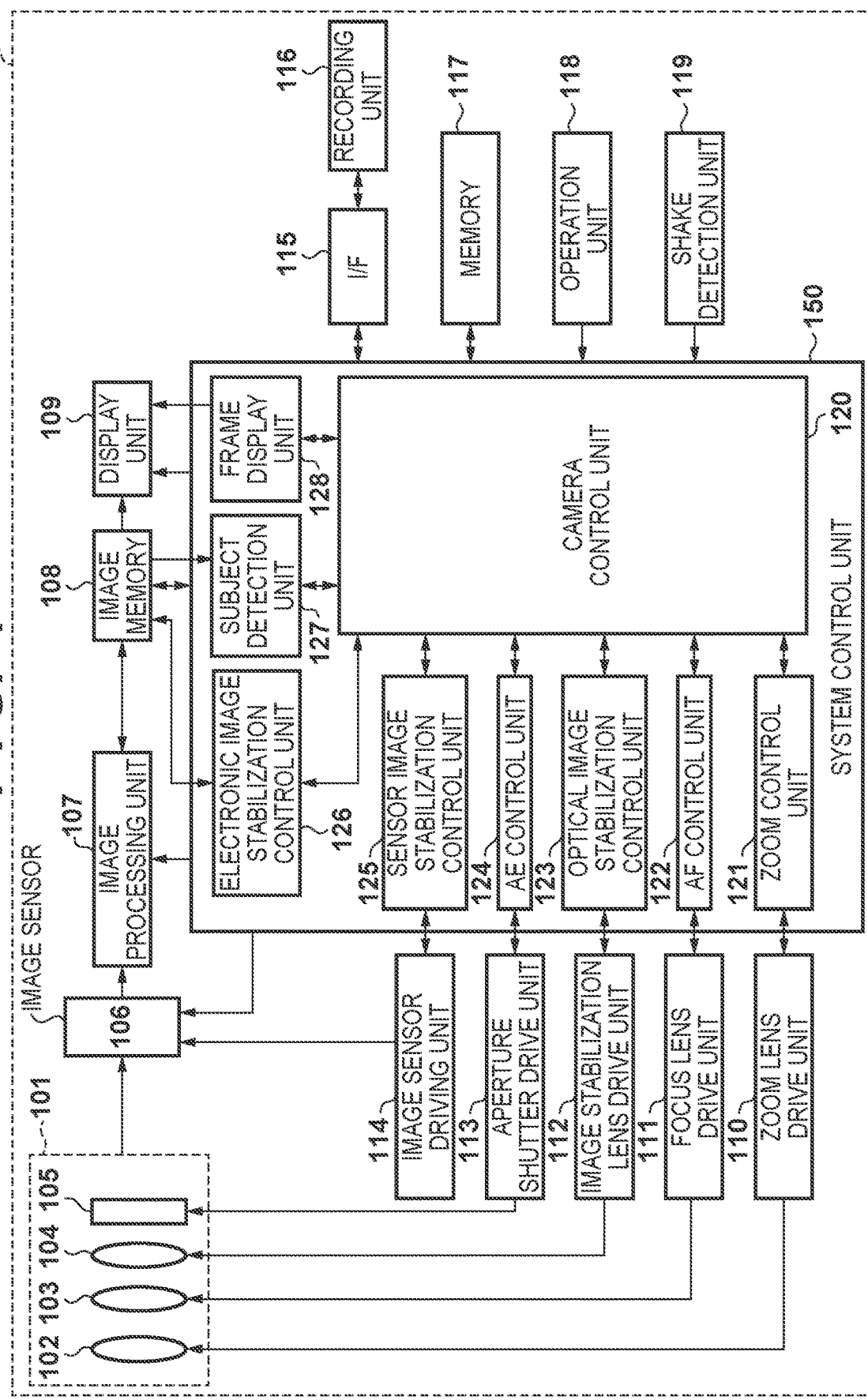

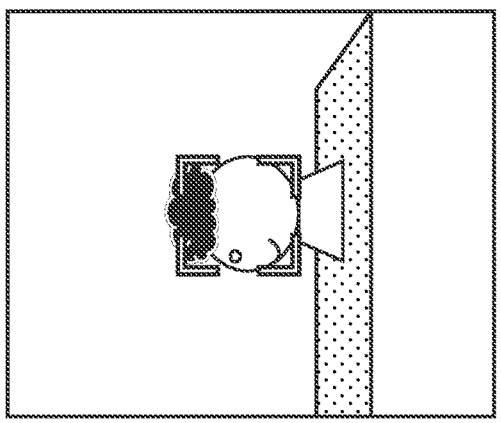
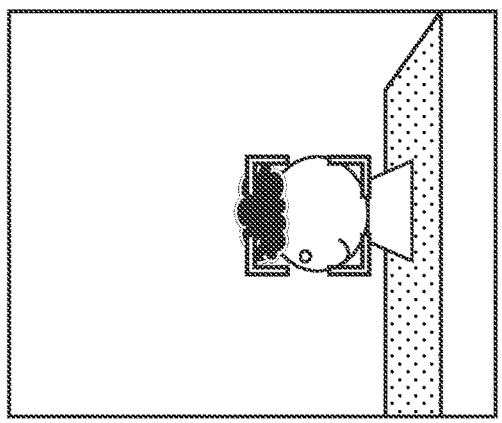
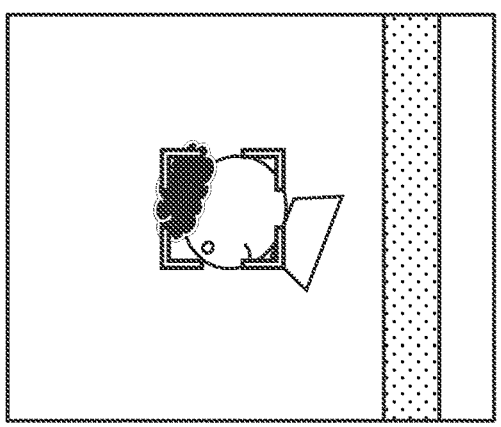
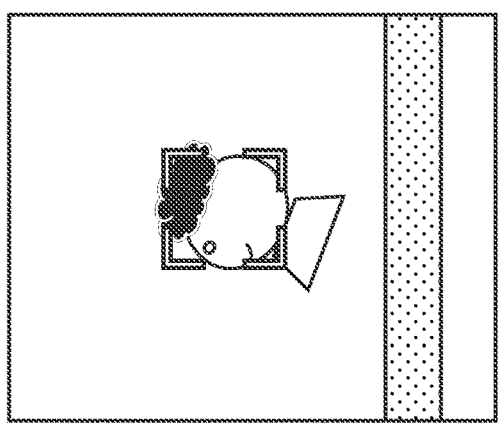
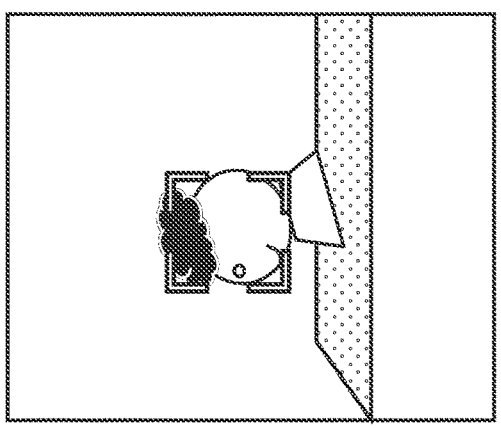
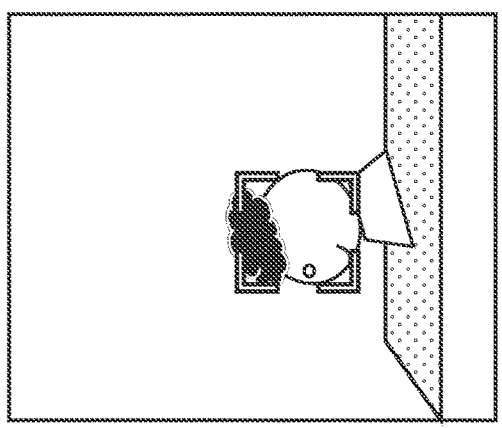
FIG. 2A
FIG. 2B

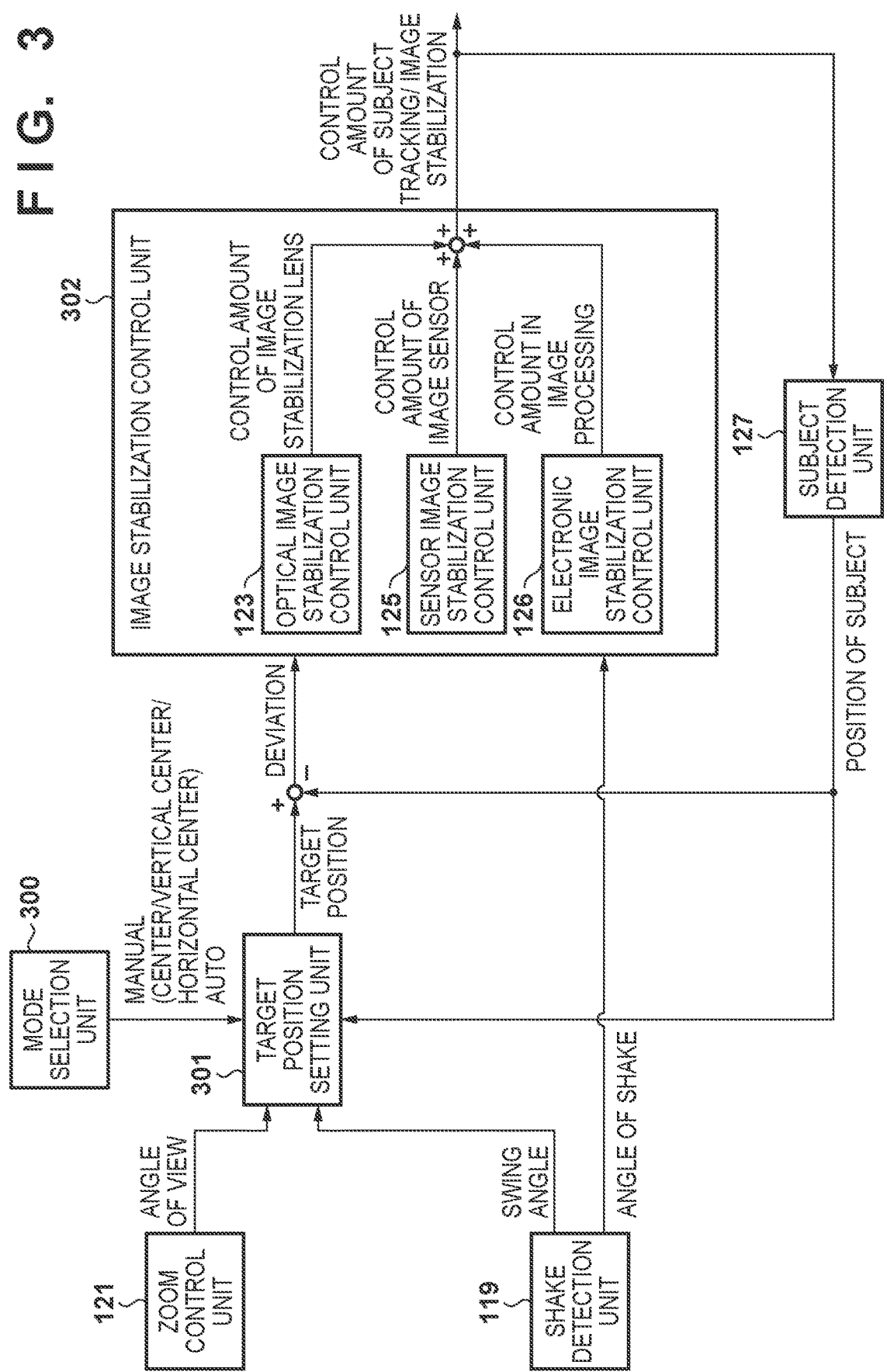

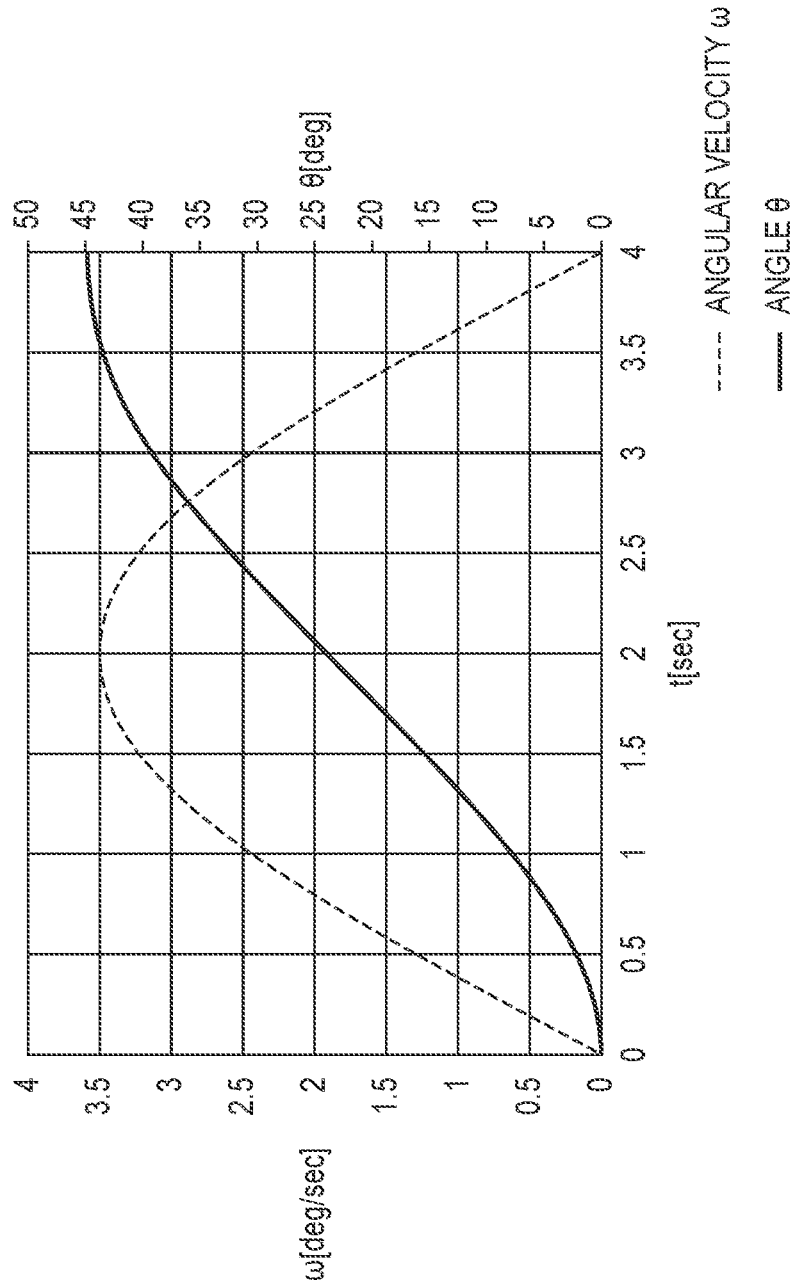

TRACKING APPARATUS AND CONTROL METHOD THEREOF, IMAGE CAPTURING APPARATUS, AND STORAGE MEDIUM

BACKGROUND OF THE INVENTION

Field of the Invention

The present invention relates to a tracking apparatus and control method thereof, an image capturing apparatus, and a storage medium.

Description of the Related Art

Conventionally, in order to support a framing operation of a subject, there is an image capturing apparatus having a function (subject tracking function) in which a user specifies a main subject among subjects detected in an image and the angle of view is made to follow the specified main subject. In an image capturing apparatus provided with such a subject tracking function, the user designates a subject image displayed on a screen using a touch panel, an operation switch, or the like, and displays a tracking frame around the designated subject image. Further, the tracking function is realized by changing an image stabilization lens and a cropping range of an image based on the position of the tracking frame.

Japanese Patent Laid-Open No. 2017-111430 discloses a configuration of a camera equipped with an image stabilization function that, in a case where the position of a detected subject image deviates from the center of the angle of view, shifts the position to maintain the subject image at the center of the angle of view. According to Japanese Patent Laid-Open No. 2017-111430, the amount of deviation between the center position of the subject image and the center position of the screen is calculated. Then, in a case where the subject image is about to go out of the angle of view due to camera shake or movement of the subject, the image stabilization lens is driven so that the amount of deviation from the center position of the screen to the subject image approaches 0, thereby preventing the subject image from going out of the screen.

However, in a case where continuous shooting or moving image shooting is performed in a scene where the continuous movement of the subject is desired to be recorded, if the position of the subject to be tracked by the subject tracking function is always kept at the center position of the screen, an obtained images or image may seem that the background, not the subject, is moving. For example, when shooting an athlete, such as a long jumper, a figure skater, and so on, it is desirable to shoot an image with a composition such that the athlete is kept in the center position of the screen in the running direction of the athlete while the movement of the athlete in the direction of jump can be seen. However, in the configuration disclosed in Japanese Patent Laid-Open No. 2017-111430, since the subject is captured at the center of the angle of view, when the subject jumps, the background ground (floor) or the like moves downward as shown in the central figure of FIG. 2A.

SUMMARY OF THE INVENTION

The present invention has been made in consideration of the above situation, and when tracking a subject, makes it possible to shoot an image with a composition that shows the movement of the subject.

According to the present invention, provided is a tracking apparatus comprising: a detection unit that detects a subject in an image obtained by photoelectrically converting light entering through an imaging optical system with an image sensor; a tracking unit that tracks the subject in a plurality of predetermined directions; a determination unit that determines a tracking direction in which the subject is to be tracked among the plurality of directions; and a control unit that controls the tracking unit to perform tracking in the tracking direction and suppress tracking in a direction different from the tracking direction, wherein each unit is implemented by one or more processors, circuitry or a combination thereof.

Further, according to the present invention, provided is an image capturing apparatus comprising: an image sensor configured to photoelectrically convert light entering through an imaging optical system and output an image; and a tracking apparatus comprising: a detection unit that detects a subject in the image; a tracking unit that tracks the subject in a plurality of predetermined directions; a determination unit that determines a tracking direction in which the subject is to be tracked among the plurality of directions; and a control unit that controls the tracking unit to perform tracking in the tracking direction and suppress tracking in a direction different from the tracking direction, wherein each unit is implemented by one or more processors, circuitry or a combination thereof.

Furthermore, according to the present invention, provided is a control method of a tracking apparatus having a tracking unit that tracks a subject in a plurality of predetermined directions, the method comprising detecting a subject in an image obtained by photoelectrically converting light entering through an imaging optical system; determining a tracking direction in which the subject is to be tracked among the plurality of directions; and controlling the tracking unit to perform tracking in the tracking direction and suppress tracking in a direction different from the tracking direction.

Further, according to the present invention, provided is a non-transitory computer-readable storage medium, the storage medium storing a program that is executable by the computer, wherein the program includes program code for causing the computer to execute a control method of a tracking apparatus having a tracking unit that tracks a subject in a plurality of predetermined directions comprising: detecting a subject in an image obtained by photoelectrically converting light entering through an imaging optical system; determining a tracking direction in which the subject is to be tracked among the plurality of directions; and controlling the tracking unit to perform tracking in the tracking direction and suppress tracking in a direction different from the tracking direction.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a configuration example of an image capturing apparatus according to an embodiment of the present invention;

FIGS. 2A and 2B are diagrams showing examples of positions of a subject tracked by a subject tracking function within an angle of view;

FIG. 3 is a block diagram showing a functional configuration for image stabilization control of the image capturing apparatus for carrying out processing according to a first embodiment;

FIG. 4 is a graph showing change of angular velocity ω and an angle θ with respect to time;

DESCRIPTION OF THE EMBODIMENTS

Figure 5:
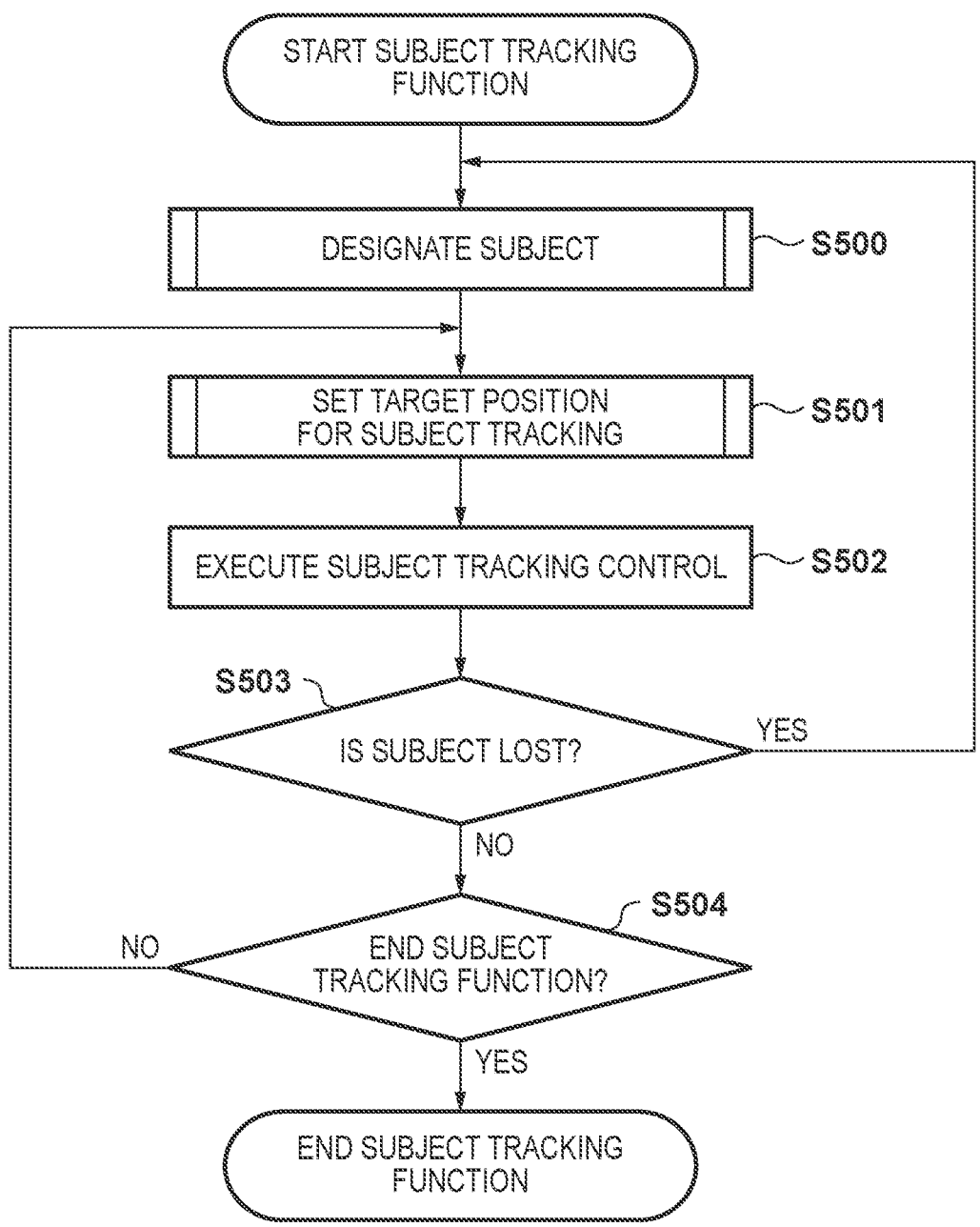
FIG. 5 is a flowchart showing a process example of a subject tracking function according to the first embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing a configuration example of a digital camera 100 having a subject tracking function as an example of an image capturing apparatus according to the present embodiment.

A lens barrel 101 holds a lens group including a zoom lens 102, a focus lens 103, and an image stabilization lens 104, and an aperture/shutter 105 (imaging optical system) inside. The zoom lens 102 adjusts a focal length by moving in the optical axis direction of the lens barrel 101, and optically changes the angle of view. The focus lens 103 adjusts the focus state by moving in the optical axis direction of the lens barrel 101. The image stabilization lens 104 corrects image blur caused by camera shake or the like (optical image stabilization). The aperture/shutter 105 adjusts an amount of light and is used for exposure control.

In the present embodiment, the digital camera 100 will be described as an image capturing apparatus in which the lens barrel 101 and the camera body are integrally configured, but the present invention is not limited thereto. The present invention can also be applied to an image capturing system composed of a camera body and an interchangeable lens that can be attached to and detached from the camera body.

An image sensor 106 is an image sensor of a CCD (charge coupling element) type, a CMOS (complementary metal oxide semiconductor) type, etc., receives light incident through the lens barrel 101, and converts a subject image into an electric signal by photoelectric conversion, thereby an image signal is generated. Image blur can be corrected by driving a mechanism that holds the image sensor 106 according to the amount of vibration (sensor image stabilization).

The image signal generated by the image sensor 106 is input to an image processing unit 107 and undergoes various processes such as pixel interpolation process and color conversion process, and the image data undergone the various processes is stored in an image memory 108. The image memory 108 is a storage device such as a Dynamic Random Access Memory (DRAM) or a Static Random Access Memory (SRAM).

The image data stored in the image memory 108 as described above is recorded in a non-volatile memory 117 or sent to a recording unit 116 via an interface (I/F) unit 115 and stored in a detachable external recording medium (not shown), or recorded in both the non-volatile memory 117 and the external recording medium. The external recording medium is a memory card or the like used by being attached to the digital camera 100. The non-volatile memory 117 is a storage medium built in the digital camera 100, and stores information such as settings of the digital camera 100 in addition to program data and image data.

A display unit 109 is configured to include, for example, a TFT type LCD (thin film transistor drive type liquid crystal display) and displays captured images (image data) and specific information (for example, shooting information). In addition, it is possible to provide an electronic viewfinder (EVF) function that can be used by the user to adjust the angle of view by displaying information such as a live view provided by sequentially displaying images taken periodically.

An operation unit 118 includes a zoom operation member such as a zoom lever or a zoom button, a release switch for instructing the start of shooting, a touch panel for designating a subject and setting the digital camera 100, and operation switches. Operation signals from the operation unit 118 is sent to a system control unit 150.

The system control unit 150 is equipped with an arithmetic unit such as a CPU (central processing unit), and controls the entire digital camera 100 by sending control commands to respective units according to a user's operation. Further, in the present embodiment, the system control unit 150 includes a camera control unit 120, a zoom control unit 121, an autofocus (AF) control unit 122, an optical image stabilization control unit 123, an automatic exposure (AE) control unit 124, a sensor image stabilization control unit 125, an electronic image stabilization control unit 126, a subject detection unit 127, and a frame display unit 128. Then, by executing various control programs stored in the memory 117, for example, the system control unit 150 controls the image sensor 106, AE/AF, optical/electronic/sensor image stabilization, zooming, and the like.

The camera control unit 120 gives instructions for controlling all camera functions. For example, when the release switch is pressed halfway, a shooting preparation operation such as AE/AF is performed, and when the release switch is fully pressed, an instruction is given to perform a shooting operation of a still image or a moving image. Further, in the subject tracking function described later, the camera control unit 120 also instructs the start/stop of subject tracking by the optical image stabilization, electronic image stabilization, and sensor image stabilization.

The zoom control unit 121 detects the operation amount and the operation direction of a zoom operation member provided in the operation unit 118, and calculates the zoom drive speed and the zoom drive direction. Then, by driving a zoom lens drive unit 110 according to the calculation result, the zoom lens 102 is controlled to move along the optical axis. The zoom lens drive unit 110 includes an actuator such as a direct current (DC) motor that drives the zoom lens 102, a position detection sensor such as a rotary encoder that detects the position of the motor, and a drive circuit that drives them. Further, other configurations such as a configuration that does not require a position detection sensor such as a stepping motor may be used. In a retractable lens barrel in which the lens barrel 101 is extended from the camera when the power is turned on, an error must be detected when the lens barrel is pressed during the lens barrel extension operation, so the former configuration is often adopted. In the inner lens barrel in which the zoom lens 102 is driven inside the lens barrel 101, the latter configuration, which is advantageous in producing less noise, is often adopted. The zoom lens drive unit 110 in the present invention may have either configuration.

The AF control unit 122 performs autofocus (AF) control of controlling a focus lens drive unit 111 so as to focus on the subject based on focus adjustment information obtained by a known method such as a contrast method or a phase difference method. The focus lens drive unit 111 is composed of an actuator such as a voice coil motor (VCM), a position detection sensor for feeding back the position of the actuator, and a drive circuit for driving them, and drives the focus lens 103. Further, other configurations such as a configuration that does not require a position detection sensor such as a stepping motor may be used.

The AE control unit 124 calculates the exposure control value (aperture value and shutter speed) based on a photometric value obtained by the image processing in the image processing unit 107. The AE control unit 124 calculates a luminance value (photometric value) in an arbitrary area (within photometric frame) in the screen according to a set photometric method. As the photometric method, spot photometry that performs photometry at a specific set position, evaluative photometry that the camera automatically determines the position of the photometric frame according to a scene, and center-weighted average photometry in which photometry is performed over the entire screen on average with an emphasis on the center of the screen. Then, the AE control unit 124 controls an aperture shutter drive unit 113 based on the photometric result. The aperture shutter drive unit 113 is composed of actuators such as a stepping motor and an electromagnetic plunger and a drive circuit for driving them, drives the aperture/shutter 105, and realizes automatic exposure adjustment.

The optical image stabilization control unit 123 calculates an amount of shake applied to the digital camera 100 based on shake detection information by an angular velocity sensor such as a gyro sensor of a shake detection unit 119. Then, by driving the image stabilization lens 104 so as to cancel (or reduce) the amount of shake applied to the digital camera 100 according to the calculation result, the optical image stabilization is realized. More specifically, the optical image stabilization control unit 123 calculates a target position for controlling the image stabilization lens 104 in a predetermined calculation cycle based on the amount of shake, and issues a drive instruction to an image stabilization lens drive unit 112. Based on the instruction, the image stabilization lens drive unit 112 drives the image stabilization lens 104. The image stabilization lens drive unit 112 is composed of an actuator such as a voice coil motor (VCM), a drive circuit, and a position detection sensor such as a Hall element. The optical image stabilization control unit 123 feeds back the position of the image stabilization lens 104 detected by the position detection sensor of the image stabilization lens drive unit 112, thereby feedback control is executed so as to hold the image stabilization lens 104 at the target position.

Similar to the optical image stabilization control unit 123, the electronic image stabilization control unit 126 calculates an amount of shake applied to the digital camera 100 at a predetermined calculation cycle based on the shake detection information by the angular velocity sensor such as a gyro sensor of the shake detection unit 119. Then, according to the calculation result, a part of the range of the image stored in the image memory 108 is read out so as to cancel (or reduce) the amount of shake applied to the digital camera 100, wherein the range of images to be displayed on the display unit 109 or recorded in the recording unit 116 is changed for each frame image, thereby the electronic image stabilization is realized.

Similar to the optical image stabilization control unit 123 and the electronic image stabilization control unit 126, the sensor image stabilization control unit 125 calculates an amount of shake applied to the digital camera 100 based on the shake detection information by the angular velocity sensor such as the gyro sensor, for example, of the shake detection unit 119. Then, the sensor image stabilization is realized by driving a mechanism that holds the image sensor 106 so as to cancel (or reduce) the amount of shake applied to the digital camera 100 according to the calculation result. More specifically, the sensor image stabilization control unit 125 calculates a target position for controlling the image sensor 106 in a predetermined calculation cycle based on the amount of shake, and issues a drive instruction to an image sensor driving unit 114. Based on the instruction, the image sensor driving unit 114 drives the image sensor 106. The image sensor driving unit 114 is composed of an actuator such as a voice coil motor (VCM) or the like, a drive circuit, and a position detection sensor such as a Hall element. The sensor image stabilization control unit 125 feeds back the position of the image sensor 106 detected by a position detection sensor of the image sensor driving unit 114, thereby feedback control is executed so as to hold the image sensor 106 at the target position.

The subject detection unit 127 detects a subject area of the predetermined subject from the image data stored in the image memory 108.

Here, a subject detection process in this embodiment will be described. In the present embodiment, a subject detection method (face detection process, color detection process) for detecting a subject (face of a person or the like, or object) based on face information or color information included in image data will be described.

The face detection process is a process of detecting a face area existing in image data using a known algorithm. For example, the subject detection unit 127 extracts a feature amount from a square-shaped partial region on the image data and compares the feature amount with a face feature amount prepared in advance. Then, the subject detection unit 127 determines that the partial region is the face area when a correlation value between the extracted feature amount and the face feature amount prepared in advance exceeds a predetermined threshold value. By repeating this determination process while changing the combination of the size, the arrangement position, and the arrangement angle of the partial region, it is possible to detect various face areas existing in the image data.

Further, if the digital camera 100 has a face authentication function, pattern matching is performed between the feature amount of the face image registered in advance and the feature amount of the detected face area using a known algorithm, and the registered face image having the highest correlation value is certified as the detected face. If the correlation values for all the registered face images are less than a predetermined value, then it is determined that the detected face area includes an unregistered face.

In the color detection process, a process of storing the color information of the subject area designated according to a subject designation method described later as a feature color is executed. The color detection process is performed when the subject to be detected is an object. As the color information, RGB signals, luminance signals (Y signals), color difference (RY, BY) signals, etc., which are output signals from the image processing unit 107, are used. At the time of subject detection, the subject detection unit 127 divides the image data into a plurality of subregions and calculates the average value of the luminance and the color difference for each subregion. Further, the subject detection unit 127 compares the feature color information stored in advance with the color information of each subregion at the time of subject detection, and sets a subregion in which the differences in the luminance and the color difference are less than a predetermined amount as a candidate for the subject area. Then, a group of adjacent subregions among the candidates for the subject area is set as the same color region, and a region of the same color region that is within a predetermined range of size is set as the final subject area.

In a case where the subject is an object, the shape of the subject area may differ depending on the object. Therefore, the smallest quadrangular region that includes all the same color regions is defined as the object area. Therefore, the object area may be a rectangular region having different lengths in the horizontal direction and the vertical direction. The center position of the quadrangular is defined as the position of the object area.

The frame display unit 128 displays a frame (subject detection frame) to show the face area and the object area detected by the subject detection process on the display unit 109.

Next, a tracking process of the subject detection frame detected by the subject detection unit 127 will be described. The tracking process of the subject detection frame is a process of continuously tracking a subject area that moves between successive frame images. When the subject tracking function is started, the area of the person or object to be the main subject is designated according to the subject designation method described later.

If the specified subject is a person, that is, a face, all faces in the frame image are detected. When a plurality of faces are detected in the same image, the subject detection unit 127 determines the face at the position closest to the face in the immediately preceding frame image as the person to be tracked. If the detected face is determined as a registered face by the face authentication function, it is determined that the authenticated face is preferentially tracked regardless of the positional relationship between the frame images.

In a case where the designated subject is an object, the feature color information comparison process is started at the position of the object area of the immediately preceding frame image. If the frame rate is sufficiently high in consideration of the speed of a moving object, it is highly likely that the same object will be detected in the neighboring area between the previous and next frame images. Therefore, it is possible to track the moving object area by performing the matching process of the same color region while shifting the subregion to be compared to left, right, up and down from the position corresponding to the position of the object area in the immediately preceding frame image by the subject detection unit 127.

The frame display unit 128 displays the face area and the object area tracked by the subject detection frame tracking process on the display unit 109 in the form of the subject tracking frame.

Next, the control related to the subject tracking function in the camera control unit 120 of the present embodiment will be described with reference to FIGS. 2A to 4.

The user specifies the main subject by operating the touch panel and the operation switch for specifying the subject of the operation unit 118. Then, the subject tracking function is executed so as to follow the designated main subject at the target position set in the screen.

FIGS. 2A and 2B are diagrams for explaining the position of the subject tracked by the subject tracking function. FIGS. 2A and 2B show an example of continuously shot images in which the subject jumps while moving from right to left, with the subject being captured in a predetermined range of the screen by the subject tracking function. As described above, FIG. 2A shows an example of images when the target position is always set near the center of the screen and the angle of view is set to track the subject. Of these images, in the center image, since the subject is always shot near the center of the screen even though the subject moves in the vertical direction, so the composition looks as if the background moves instead of the subject. On the other hand, FIG. 2B is an example of images obtained when the target position is set to the vicinity of the center of the screen in the horizontal direction and to the detected subject position in the vertical direction (that is, the tracking control is deactivated). Comparing FIGS. 2A and 2B, FIG. 2B has a composition in which the movement of the subject jumping in the vertical direction can be seen when viewed as a continuous image. The present embodiment aims to track a subject so as to have the composition shown in FIG. 2B.

FIG. 3 is a block diagram showing a functional configuration for image stabilization control of the image capturing apparatus according to the first embodiment. A mode selection unit 300 selects a setting mode for setting a target position of subject tracking according to the operation of the operation unit 118 by the user. The target position setting mode includes a manual mode in which the target position at which a subject is to be tracked is set by the user, and an auto mode in which the camera detects a framing operation and automatically sets the target position. As examples of the manual mode, there are a "center" mode that tracks a subject near the center of the screen in both the vertical and horizontal directions, a "vertical center" mode that tracks a subject near the center in the vertical direction but not in the horizontal direction, and a "horizontal center" mode that tracks a subject near the center in the horizontal direction but not in the vertical direction. In the scenes shown in FIGS. 2A and 2B, the tracking effect as shown in FIG. 2B can be obtained by selecting the "horizontal center" mode in advance by the user.

On the other hand, in the auto mode, the target position setting unit 301 automatically sets the target position based on the angle of view acquired from the zoom control unit 121, a swing angle acquired from the shake detection unit 119, and the subject position information acquired from the subject detection unit 127.

The angle of view of the camera can be calculated from the focal length of the zoom lens 102 controlled by the zoom control unit 121 and the size of the image sensor 106. Assuming that the focal length is f and the horizontal size of the image sensor 106 is h, the angle of view $\phi$ is $\phi=2\times a\tan(h/2f)$. Further, the angle of view in the vertical direction can also be obtained by the same calculation method.

The swing angle of the camera can be calculated by integrating the angular velocity detected by the angular velocity sensor such as the gyro sensor of the shake detection unit 119. FIG. 4 is a graph showing the change of the angular velocity $\omega$ (broken line) and the angle $\theta$ (solid line) with respect to time. This graph shows a case where the camera is panned or tilted for about 45 degrees at a maximum angular velocity of about 3.5 deg/sec in the horizontal or vertical direction in about 4 seconds. Assuming that the angular velocity at time n detected by the shake detection unit 119 is $\omega n$ and the sampling period is T, the angle $\theta n$ that the camera moves during the sampling period T is $\theta n=\omega n\times T$. Further, when it is detected that the camera is panning or tilting at an angular velocity $\omega$, which exceeds a predetermined angular velocity, the angle $\theta n$ during that period is added, that is, the swing angle $\theta$ can be calculated by $\theta=\Sigma\theta n$.

A target position setting unit 301 compares the angle of view $\phi$ and the swing angle $\theta$, and determines that the direction in which the swing angle $\theta$ exceeds the angle of view $\phi$ (a value obtained by multiplying the angle of view $\phi$ by a predetermined coefficient may be used instead) is the direction of tracking a moving subject by swinging the camera. The tracking control is activated in the direction of tracking the subject with the target position being set near the center of the screen. It is determined that the direction in which the swing angle $\theta$ is smaller than the angle of view $\phi$ is not the direction of tracking the subject, and the target position is set to the detected subject position to deactivate the tracking control. That is, in the direction in which the camera is swung to follow the subject, the tracking control is activated to prevent the subject from going out of the screen, and in the direction in which the subject is not being followed, it is possible to express the movement of the subject in the composition. In FIG. 2B, the target position is automatically set so that the tracking of the subject is activated only in the horizontal direction from the detection results of the angle of view $\phi$ and the swing angle $\theta$.

Next, an image stabilization control unit 302 will be described. The image stabilization control unit 302 is composed of the optical image stabilization control unit 123, the sensor image stabilization control unit 125, and the electronic image stabilization control unit 126. In the subject tracking control, feedback control is performed so that the deviation between the target position set by the target position setting unit 301 and the subject position detected by the subject detection unit 127 becomes zero. The control method by feedback control will be described later with reference to the description of step S502 in FIG. 5. Each image stabilization control unit controls based on either or both of the above-mentioned deviation for the subject tracking control and the shake amount detected by the shake detection unit 119 for image stabilization control. The image stabilization control unit 302 allocates the subject tracking control for correcting the subject position and the image stabilization control for correcting shake to the image stabilization control units 123, 125 and 126 in accordance with the features of the image stabilization control units 123, 125 and 126.

The features of the optical image stabilization and the sensor image stabilization are that the shake can be optically corrected by moving the image stabilization lens 104 and image sensor 106, so it is possible to correct the shake with little deterioration in resolution of an image. In the optical image stabilization, since the movable range of the image stabilization lens 104 is wide on the telephoto side, a high correction effect can be obtained on the telephoto side. On the other hand, in the sensor image stabilization, since the drive range of the drive unit of the image sensor 106 is limited on the telephoto side and the resolution is high on the wide-angle side, a high correction effect can be obtained in the wide-angle to intermediate range.

On the other hand, the feature of the electronic image stabilization is that, by reducing the size of the output image to the display unit 109 and the recording unit 116, the controllable range of the electronic image stabilization is increased, and the image stabilization effect can be enhanced. However, if the size of the output image is reduced, the resolution of the image is deteriorates.

In consideration of the above features, as an example of assignment of control to the optical image stabilization control unit 123, the sensor image stabilization control unit 125, and the electronic image stabilization control unit 126, the image stabilization is performed by using the optical image stabilization and the sensor image stabilization, and the subject tracking is performed by using the electronic image stabilization. Furthermore, in the image stabilization, it is conceivable to set a higher ratio of control to the optical image stabilization on the telephoto side and set a higher ratio of control to the sensor image stabilization on the wide-angle side. Further, different allocation ratios may be set to a still image and a moving image. That is, in the present invention, the subject tracking control and the image stabilization control can be performed any of the optical image stabilization control unit 123, the sensor image stabilization control unit 125, and the electronic image stabilization control unit 126. The control amount which is the sum of the optical and electronic correction amounts used by the optical image stabilization control unit 123, the sensor image stabilization control unit 125, and electronic image stabilization control unit 126 is output as a final control amount for the subject tracking and the image stabilization for a captured image or a live view image.

Next, the processing of the subject tracking function will be described with reference to FIGS. 5 to 7. FIG. 5 is a flowchart showing an overall processing example of the subject tracking function. Unless otherwise stated, the subject tracking function described below shall be performed in accordance with instructions from the camera control unit 120.

When the start of the subject tracking function is instructed by the operation of the start button for the subject tracking function or on the menu, the camera control unit 120 performs the process of designating a subject in step S500. Here, the subject designation process performed in step S500 will be described with reference to FIGS. 6A and 6B.

Figure 6A:
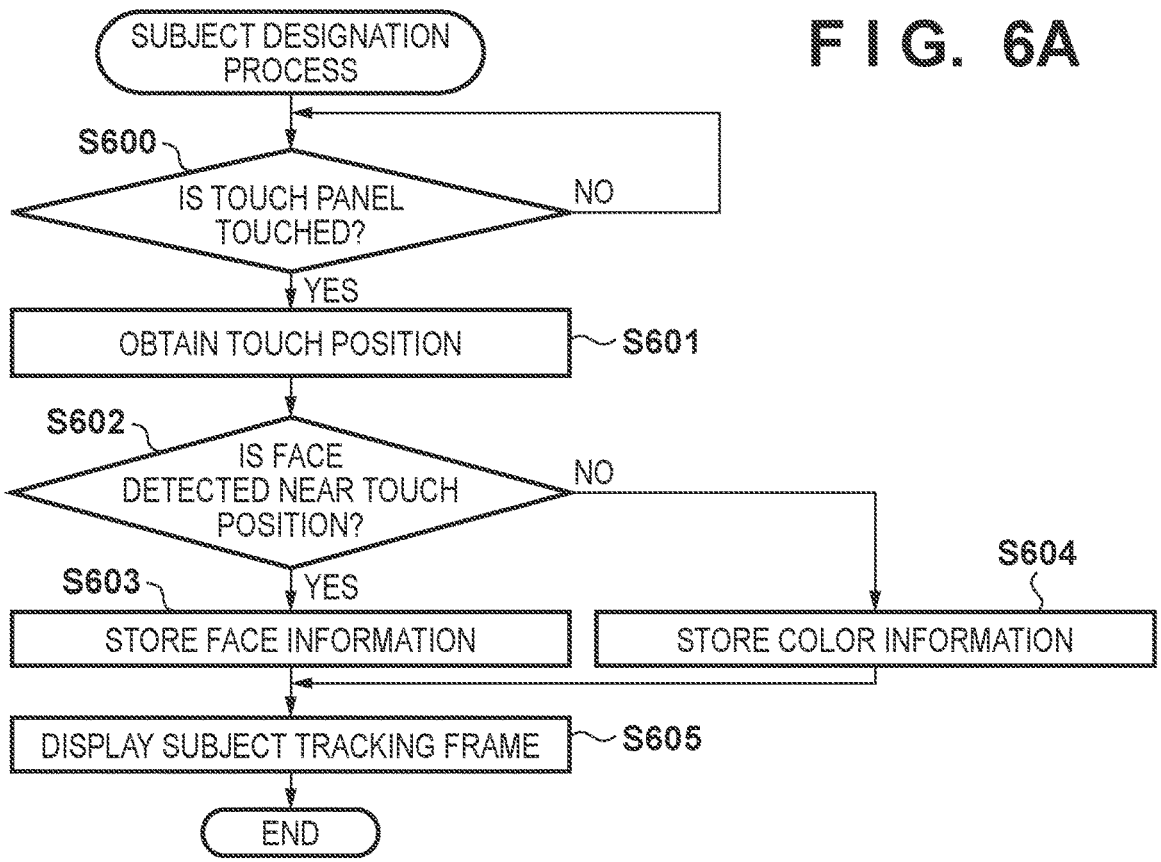
FIGS. 6A and 6B are flowcharts illustrating subject designation processes according to the first embodiment.

FIG. 6A is a flowchart showing a process example in which a user designates a desired subject using a touch panel constituting the operation unit 118. In this example, it is assumed that the user touches to designate the subject image displayed on the display unit 109. In step S600, the camera control unit 120 determines whether or not the touch panel is touched. If the touch panel is touched, the process proceeds to step S601, whereas if the touch panel is not touched, the determination process of step S600 is repeated.

In step S601, the camera control unit 120 acquires information on the position (touch position) touched by the user. In next step S602, the camera control unit 120 notifies the subject detection unit 127 of the touch position, and the subject detection unit 127 detects a face near the touch position. When a face is detected near the touch position in step S602, it is determined that the main subject is a person, and the process proceeds to step S603. If no face is detected near the touch position in step S602, it is determined that the main subject is an object other than a person, and the process proceeds to step S604.

In step S603, the camera control unit 120 controls to store, in the memory 117, the face information of the person to be automatically tracked. Specific face information includes information such as the size and the detection position of the face and the orientation of the face when the subject is designated. Further, in a camera having a face authentication function, identification information such as an authentication ID is also stored in the memory 117.

On the other hand, in step S604, the camera control unit 120 controls to store a feature color near the touch position in the memory 117 as the color information to be automatically tracked. Specific color information includes information such as the feature color and its luminance, a color difference value, a size of the same color region, and a position of the center of gravity of the same color region when a subject is designated. Further, in a camera having an object authentication function, identification information such as an authentication ID is also stored in the memory 117.

In the following explanation, the face information and the color information are collectively referred to as subject information (including subject size, subject detection position, etc.).

After the subject information is stored in the memory 117 in step S603 or S604, the process proceeds to step S605 and the subject tracking frame is displayed. In step S605, the frame display unit 128 controls to display on the display unit 109 a subject tracking frame having a size corresponding to the subject size, centering on the subject detection position. Then, the subject designation process is completed.

In this way, in the system control unit 150, the subject detection unit 127 detects the subject at the position in the display unit 109 designated by the user or in the vicinity of the designated position. Then, the frame display unit 128 displays the subject tracking frame on the display unit 109. According to the processing example of FIG. 6A, the subject that the user wishes to track can be easily designated by an intuitive method.

However, the method of designating the subject is not limited thereto. Another method will be described with reference to FIG. 6B.

Figure 6B:
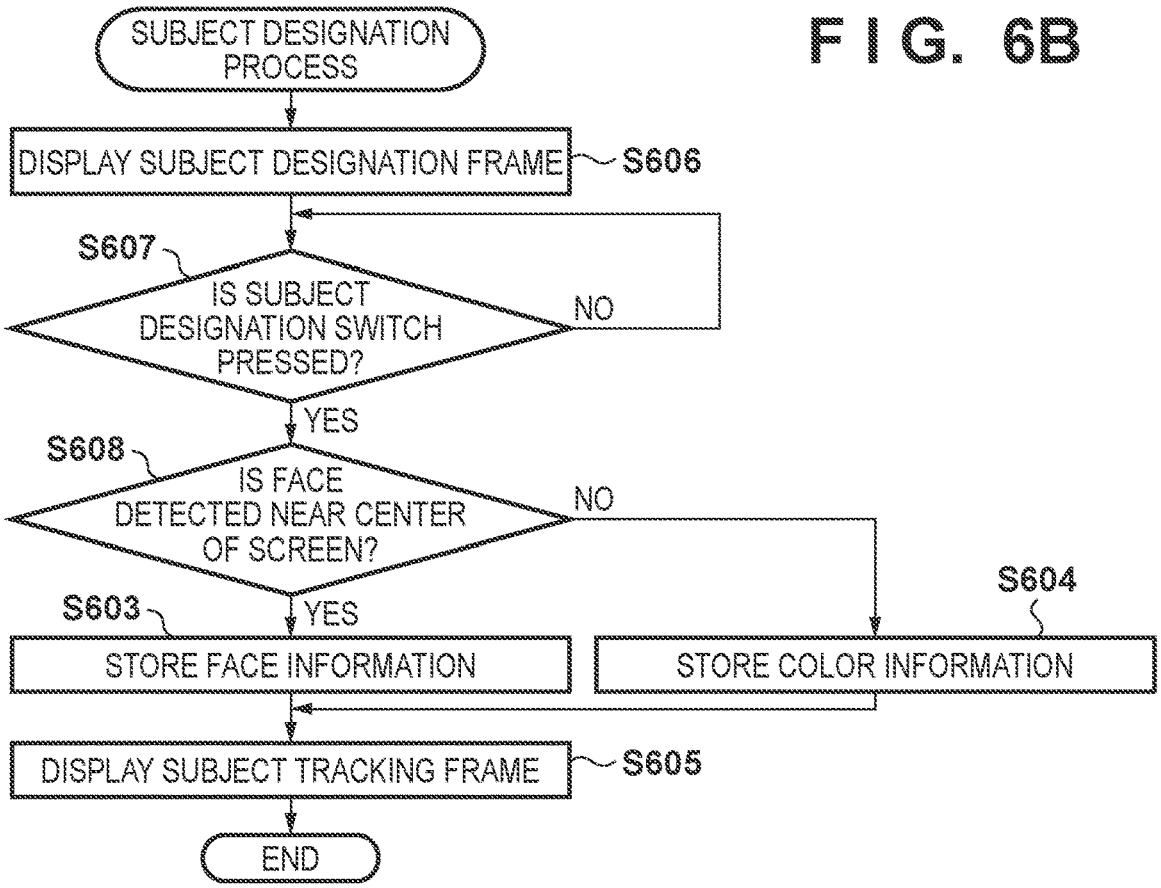

FIG. 6B is a flowchart showing a process example when a user designates a subject by using a subject designation switch as an operation member constituting the operation unit 118. First, in step S606, the frame display unit 128 displays a frame as a guide for designating a subject near the center of the screen of the display unit 109. The user adjusts the shooting direction of the camera so that the image of the subject to be tracked is placed near the center of the screen using this frame as a guide. In the next step S607, the camera control unit 120 determines whether or not the subject designation switch, which is one of the operation members of the operation unit 118, is pressed. When the subject designation switch is pressed, the process proceeds to step S608, and when the switch is not pressed, the determination process of step S607 is repeated in the waiting state.

In step S608, the subject detection unit 127 performs face detection near the center of the screen. When a face is detected near the center of the screen, it is determined that the main subject is a person, and the process proceeds to step S603. On the other hand, when a face is not detected near the center of the screen, it is determined that the main subject is an object other than a person, and the process proceeds to step S604. Since the processes after step S603 is the same as the processes in FIG. 6A, the same step numbers are assigned and the description thereof will be omitted.

As described above, in the processing example of FIG. 6B, the subject detection unit 127 detects the subject at the center position of the screen or the vicinity of the center position of the screen of the display unit 109. Then, the frame display unit 128 causes the display unit 109 to display a subject tracking frame indicating the position of the subject. In this method, the user can easily specify the subject even in a camera that is not equipped with an operation member such as a touch panel.

Regarding the subject designation process, in the case of a camera having both a touch panel and a subject designation switch constituting the operation unit 118, both the method of FIG. 6A and the method of FIG. 6B may be applied. Further, the subject designation process to be applied may be changed according to the flow of processing.

When the subject designation process of step S500 in FIG. 5 is completed, the process proceeds to step S501 to set the target position for subject tracking. While the subject tracking function continues, the processes of steps S501 to S504 described below are repeated. As the cycle for executing the processes of steps S501 to S504, since the subject tracking control is performed based on the position of the subject detected in the image, as an example, the cycle is synchronized with the frame rate (for example, 30 fps) of the live view or the moving image.

Here, the target position setting process for subject tracking in step S501 will be described with reference to FIG. 7. In the target position setting process for subject tracking, the swing angle and the subject position are determined for each of the vertical and horizontal directions, and a setting process of the target position for subject tracking is executed.

First, in step S700, it is determined whether or not the target position setting mode is the auto mode. In the case of the auto mode, the process proceeds to step S702. On the other hand, not in the case of the auto mode, that is, in the case of the manual mode, the process proceeds to step S701 where whether the mode is the center mode or the horizontal center mode (that is, whether at least the horizontal direction is the tracking direction) is determined, and in either case, the process proceeds to step S705. If neither is the case, that is, in the case of the vertical center mode, the process proceeds to step S706.

In step S702, the angle of view is acquired from the zoom control unit 121, the swing angle is acquired from the shake detection unit 119, and the swing angle with respect to the angle of view is determined in the horizontal direction. If the swing angle is equal to or less than the angle of view (the threshold value or below), the process proceeds to step S703, and if the swing angle is larger than the angle of view (greater than the threshold value) (that is, the horizontal direction is the tracking direction), the process proceeds to step S705. In step S705, the target position in the horizontal direction is set to the center position of the screen.

In step S703, it is determined whether or not the subject position acquired from the subject detection unit 127 is within a predetermined range in the screen in the horizontal direction. If it is determined that the subject position is within the predetermined range, the process proceeds to step S704, and the target position in the horizontal direction is set to the current position of the subject in the horizontal direction. As a result, it is possible to deactivate the subject tracking in the horizontal direction in combination with the process of step S502 described later.

On the other hand, if it is determined that the subject position is not within the predetermined range in the screen in the horizontal direction, the process proceeds to step S705 and the target position in the horizontal direction is set to the center position of the screen to prevent the subject from going out of the screen. As the range used for the determination in step S703, a relatively wide range is set because the purpose is to prevent the subject from going out of the screen. This range becomes the allowable range of movement in the horizontal direction, and for example, when tracking a subject in the vertical direction, it is possible to express the movement of the subject within the allowable range in the horizontal direction.

Next, in step S706, it is determined again whether the target position setting mode is the auto mode, and in the case of the auto mode, the process proceeds to step S708. On the other hand, not in the case of the auto mode, that is, in the case of the manual mode, the process proceeds to step S707 where whether the mode is the center mode or the vertical center mode (that is, whether at least the vertical direction is the tracking direction) is determined, and in either case, the process proceeds to step S711. If neither is the case, that is, in the case of the horizontal center mode, the tracking target position setting process is ended.

In step S708, the swing angle with respect to the angle of view is determined in the vertical direction based on the angle of view acquired from the zoom control unit 121 and the swing angle acquired from the shake detection unit 119. When the swing angle is equal to or less than the angle of view (the threshold value or below), the process proceeds to step S709, and when the swing angle is larger than the angle of view (greater than the threshold value) (that is, the vertical direction is the tracking direction), the process proceeds to step S711. In step S711, the target position in the vertical direction is set to the center position of the screen.

In step S709, it is determined whether or not the subject position acquired from the subject detection unit 127 is within a predetermined range in the screen in the vertical direction. If it is determined that the subject position is within the predetermined range, the process proceeds to step S710, and the target position in the vertical direction is set to the current position of the subject in the vertical direction. As a result, it is possible to deactivate the subject tracking in the vertical direction in combination with the process of step S502 described later.

On the other hand, if it is determined that the subject position is not within the predetermined range in the screen in the vertical direction, the process proceeds to step S711 and the target position in the horizontal direction is set to the center position of the screen to prevent the subject from going out of the screen, similarly to step S703. As the range used for the determination in step S709, a relatively wide range is set because the purpose is to prevent the subject from going out of the screen. This range becomes the allowable range of movement in the vertical direction, and for example, when tracking a subject in the horizontal direction, it is possible to express the movement of the subject within the allowable range in the vertical direction.

In steps S702 and S708, the case where the swing angle is compared with the angle of view has been described, but the present invention is not limited to this. For example, the swing angle may be compared with a threshold value determined based on the angle of view, such as 50% of the angle of view, or may be compared with a predetermined fixed value instead of the angle of view.

When the target position setting process for subject tracking in step S501 is completed, the process proceeds to step S502 to execute subject tracking control. In the subject tracking control in step S502, the positions of the image stabilization lens 104 and the image sensor 106 and the recording range of an image in the image memory 108, which are items to be controlled, are controlled by the control units to which the subject tracking control is assigned in the image stabilization control unit 302. Then, feedback control is performed so that the deviation between the target position set in step S501 and the subject position detected by the subject detection unit 127 becomes zero. As a feedback control method, a control method such as PID control can be applied. The control amount u of the PID control is calculated using the following equation (1).

$$u = Kp \times e + Ki \times \int e\,dt + Kd \times \frac{d}{dt}e \qquad (1)$$

u: control amount
e: deviation
Kp: proportional gain
Ki: integral gain
Kd: derivative gain The control amount of the PID control is calculated using a sum of the proportional element, the integral element, and the derivative element with respect to the deviation between the target position and the subject position. The proportional element is a control amount proportional to the deviation, and the control amount gradually decreases as the subject position approaches the target position, so that the subject can be tracked smoothly. Since the error (steady state deviation) between the target position and the subject position remains only with the proportional element, the steady state deviation can be corrected by integrating the deviation using the integral element. The derivative element is a derivative value (difference value) of the subject position between consecutive image frames, and has the effect of predicting a change in the subject position on the screen. Therefore, the responsiveness of subject tracking can be improved with the derivative element.

The control gains Kp, Ki, and Kd are tuned so as to have appropriate values in consideration of the speed or the like at which the subject is moved to the center of the screen in the tracking control. Generally, increasing the gain can improve the responsiveness of tracking, but if the subject position moves too quickly on the screen, the framing operation may become difficult. Further, if the gain is too high, the control may oscillate, that is, a hunting phenomenon may occur in which the subject moves back and forth near the center of the screen. Therefore, it is necessary to set parameters by taking into account the responsiveness of subject tracking and the oscillation margin of control by measuring a step response and frequency response of the control. The PID control is a widely applied control, and good responsive control can be realized with relatively simple arithmetic processing. In the present embodiment, the control method of the PID control has been described, however, the present invention is not limited to this control method. If it is unnecessary to improve the tracking accuracy and responsiveness of the subject position, only a P control or a PI control may be performed, or another control may be performed by using various filters.

After the subject tracking control is executed in step S502, the process proceeds to step S503. In step S503, it is determined whether or not the subject detected by the subject detection unit 127 is continuously detected. If the subject is lost, the process returns to step S500 and the subject designation process is executed again. If the subject is kept detected, the process proceeds to step S504. In step S504, it is determined whether or not the subject tracking function is ended. When it is determined in step S504 that the subject tracking function is terminated by operating an end button of the subject tracking function, a menu, and the like, the subject tracking function is ended.

As described above, according to the first embodiment, the target position setting unit 301 sets the target position for subject tracking in the image stabilization control unit 302 based on a swing angle, an angle of view, and a subject position detected by the shake detection unit 119, the zoom control unit 121, and the subject detection unit 127 in each of the vertical and horizontal directions. As a result, according to the present embodiment, it is possible to shoot an image of a subject with a composition with which the movement of the subject can be recognized even when the subject is being tracked, and at the same time, it is possible to prevent a moving subject from going out of the screen.

Second Embodiment

Figure 8:
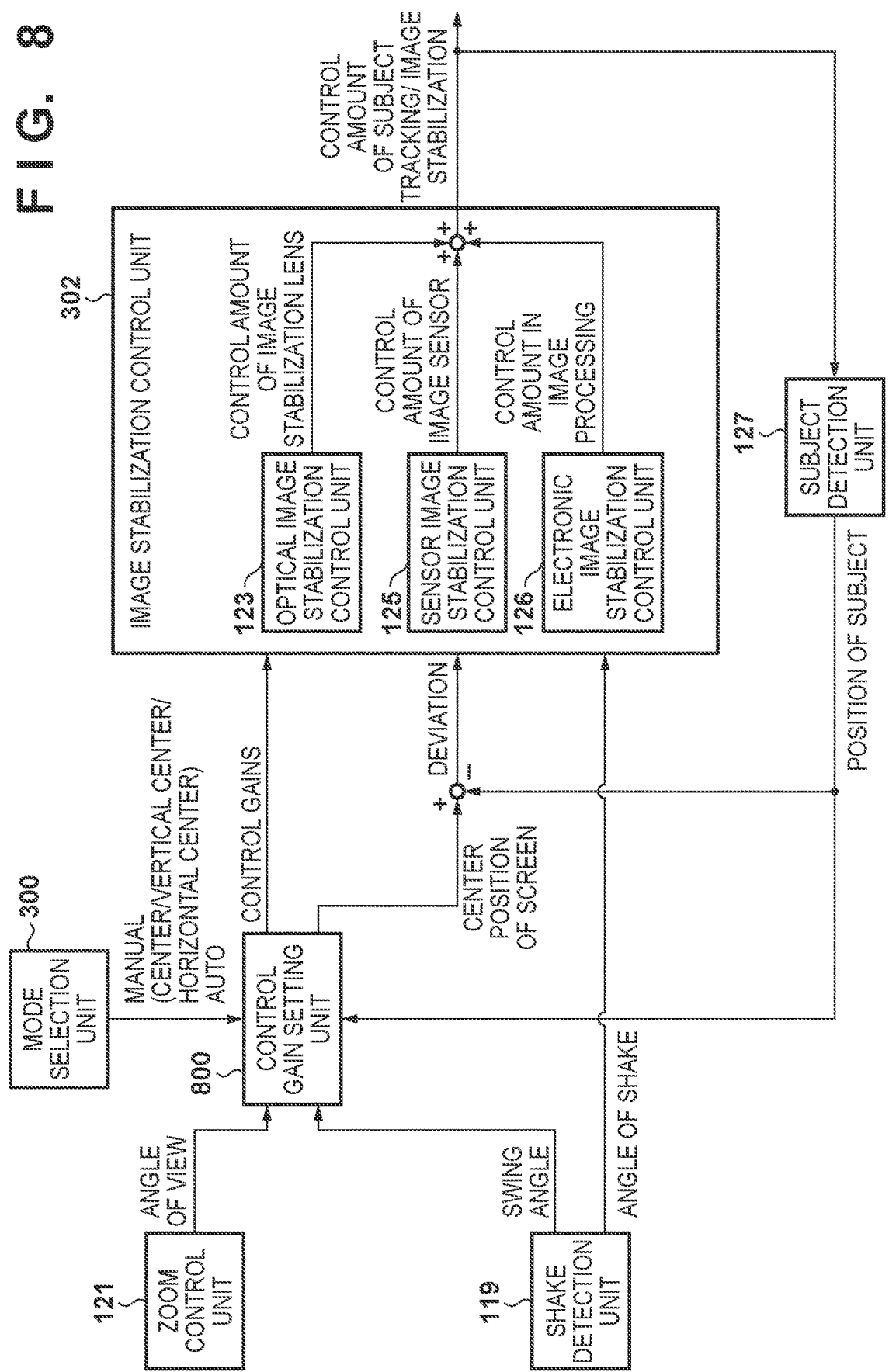
FIG. 8 is a block diagram showing a functional configuration of image stabilization control in the image capturing apparatus for carrying out processing according to a second embodiment.

Next, a second embodiment of the present invention will be described. FIG. 8 is a block diagram showing a functional configuration of an image capturing apparatus for carrying out the processing according to the second embodiment. The difference between FIG. 8 and FIG. 3 described in the first embodiment is that a control gain setting unit 800 is provided instead of the target position setting unit 301. Since the other configurations are the same as those shown in FIG. 3, the same reference numerals are given and the description thereof will be omitted.

In the first embodiment, in each of the horizontal direction and the vertical direction, the target position is set to the center of the screen for enabling the effect of the tracking control, and the target position is set to the subject position for disabling the effect of the tracking control. On the other hand, in the second embodiment, the target position is always set to the center of the screen, the process of step S501 in FIG. 5 is not performed, and the control gains for calculating the control amount u represented by the equation (1) in step S502 is adjusted to change the effect of tracking control.

The control gain setting unit 800 shown in FIG. 8 sets the control gains based on the angle of view acquired from the zoom control unit 121, the swing angle acquired from the shake detection unit 119, and the subject position information acquired from the subject detection unit 127. The angle of view and swing angle of the camera are calculated by the same processing as in the first embodiment.

Figure 9:
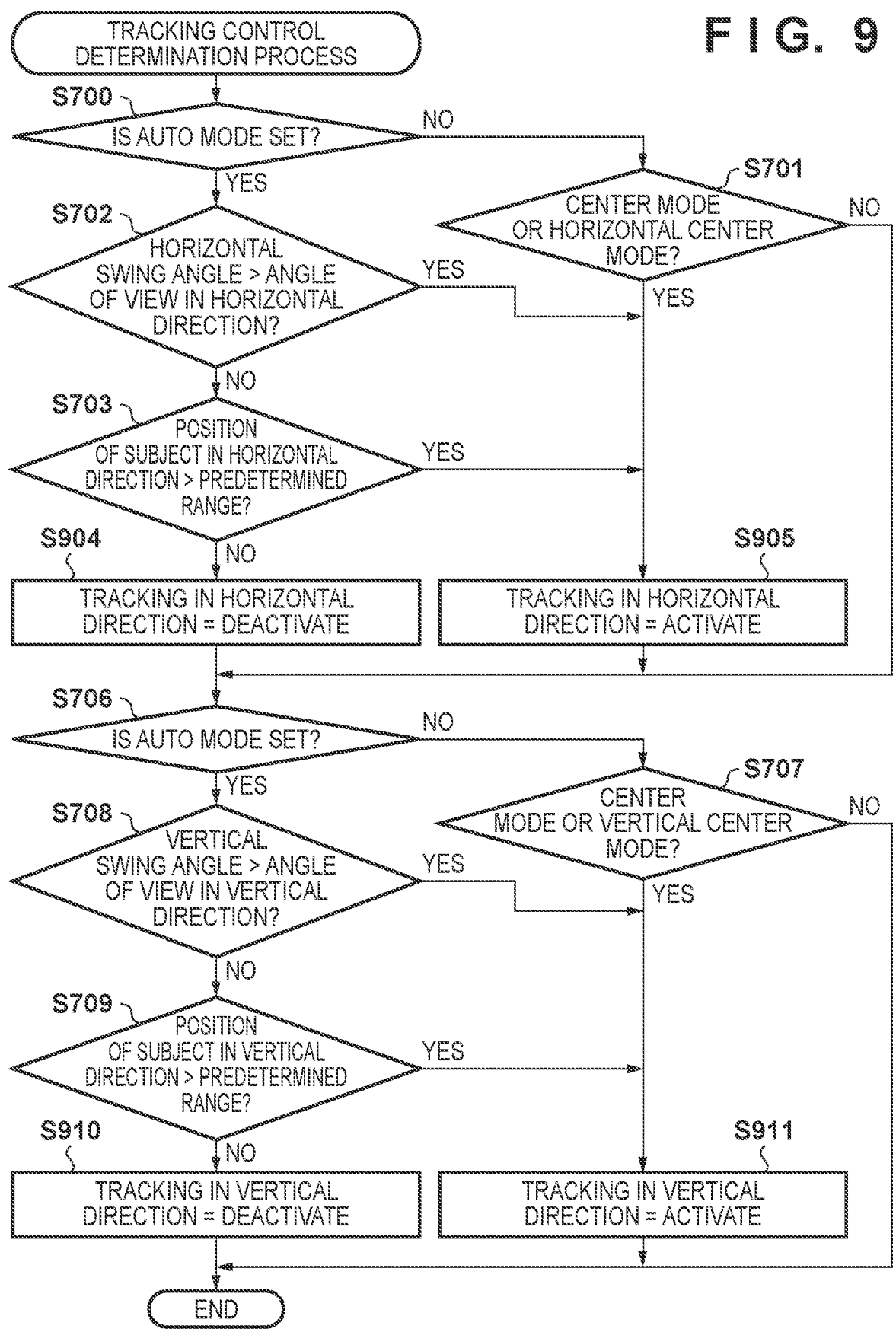
FIG. 9 is a flowchart illustrating a tracking control determination process according to the second embodiment.

Further, whether or not to activate the tracking control is determined by a tracking control determination process shown in FIG. 9. Since the processes shown in FIG. 9 are the same as the processes shown in FIG. 7 except for steps S904, S905, S910, and S911, the same step numbers are assigned to the same processes and the description thereof will be omitted. In the process shown in FIG. 9, instead of setting the target position in the horizontal direction in steps S704 and S705 of FIG. 7, the tracking in the horizontal direction is deactivated in step S904 and the tracking in the horizontal direction is activated in step S905. Similarly, in step S910, the tracking in the vertical direction is deactivated, and in step S911, the tracking in the vertical direction is activated.

In this manner, in a case where it is determined that the tracking control is to be activated by determining the swing angle of the camera and the subject position, the control gain setting unit 800 sets control gains, tuned in advance, to the image stabilization control unit 302 so that the subject can be tracked. When it is determined that the tracking control is to be deactivated, the control gain setting unit 800 sets low control gains to the image stabilization control unit 302.

In the equation (1), when the control gains Kp, Ki, and Kd are reduced, the control amount u is reduced, and the effect of subject tracking control can be suppressed. That is, by lowering the control gains, it becomes possible to finely adjust the tracking performance such that the tracking speed to the center of the screen set as the target position is slowed down or the steady-state deviation is intentionally left. Further, by setting the control gains Kp, Ki, and Kd to 0, the control amount u becomes 0, and the tracking control can be completely deactivated.

As described above, according to the second embodiment, the control gain setting unit 800 can finely adjust the tracking speed and the like by setting the target position for subject tracking to the center of the screen, and changing the control gains for subject tracking based on a swing angle, an angle of view, and a subject position. As a result, it is possible to shoot an image of a subject with a composition with which the movement of the subject can be recognized even when the subject is being tracked, and at the same time, it is possible to prevent a moving subject from going out of the screen.

Third Embodiment

Next, a third embodiment of the present invention will be described.

In the first embodiment, an example of activating/deactivating subject tracking by setting the target position for subject tracking in the horizontal direction and the vertical direction to the center position of the screen or the position of the subject has been described. On the other hand, in the third embodiment, it will be described that a swing direction in the image plane orthogonal to the optical axis is calculated from the ratio of the swing angle in the horizontal direction to the swing angle in the vertical direction, and the target position is calculated according to the swing direction. Since the image capturing apparatus having the functional configuration described in the first embodiment with reference to FIG. 3 can be used as an image capturing apparatus in the third embodiment, the description thereof will be omitted here.

Figure 10A:
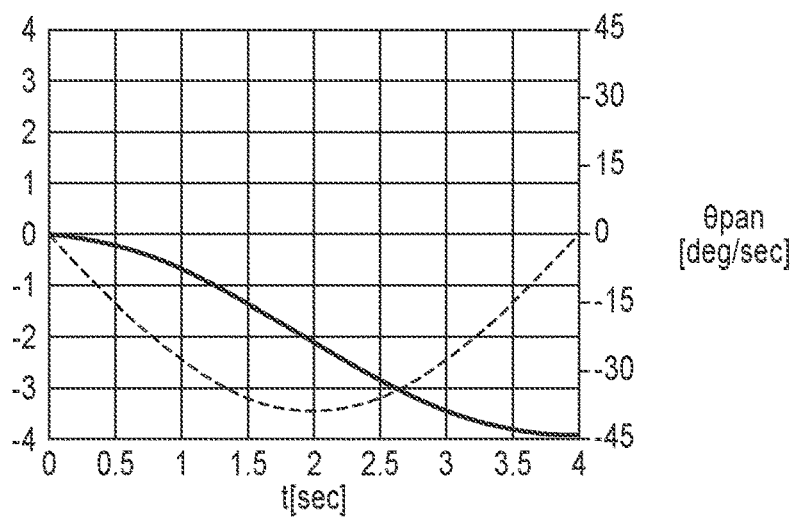
FIGS. 10A to 10C are graphs showing angular velocities, angles, and swing directions in an image plane according to a third embodiment.
Figure 10B:
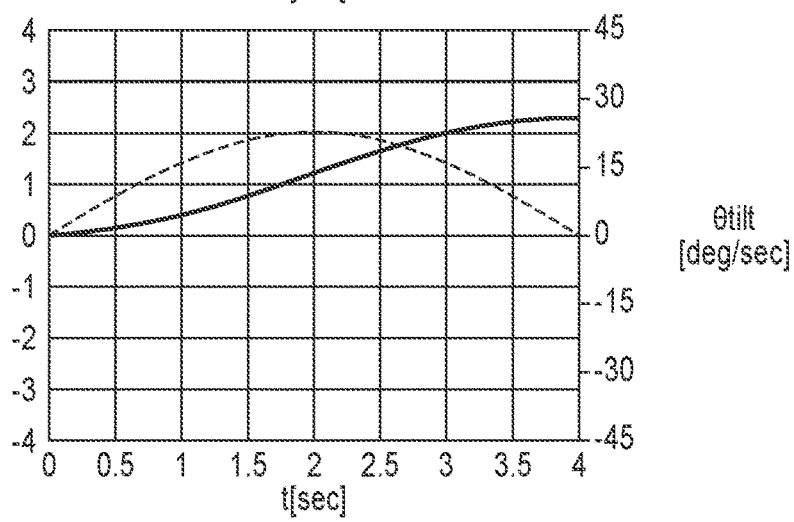
Figure 10C:
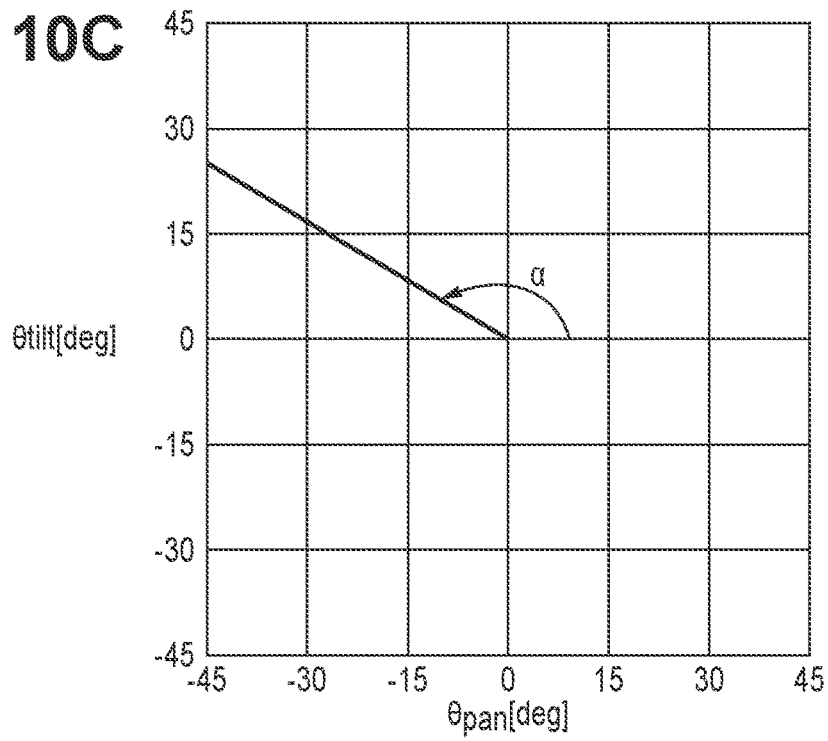

FIGS. 10A to 10C are graphs showing the angular velocity $\omega$ detected by the angular velocity sensor when following the subject while swinging the camera, the angle $\theta$ obtained by integrating the angular velocity $\omega$, and the swing direction $\alpha$ in the image plane. FIG. 10A is a graph showing the angular velocity $\omega\text{pan}$ and the angle $\theta\text{pan}$, which are the detection results of the angular velocity sensor in the horizontal direction. Similarly, FIG. 10B is a graph showing the angular velocity $\omega\text{tilt}$ and the angle $\theta\text{tilt}$, which are the detection results in the vertical direction. In each graph, the horizontal axis represents time t, and the vertical axis represents angular velocity or angle, wherein the angular velocity ω is indicated by a broken line, and the angle θ is indicated by a solid line.

FIG. 10C is a graph in which the horizontal axis is the angle θpan in the horizontal direction shown in FIG. 10A and the vertical axis is the angle θtilt in the vertical direction shown in FIG. 10B. The swing direction α in the image plane can be calculated by α=a tan(θtilt/θpan) based on the ratio of the angle θpan in the horizontal direction and the vertical angle θtilt in the vertical direction. The graphs show a case where the camera is swung about 45 degrees at about 3.5 deg/sec at maximum in the horizontal left direction and about 25 degrees at about 2.0 deg/sec at maximum in the vertical upward direction in about 4 seconds.

That is, the swing direction α is calculated from α=a tan (25 deg/−45 deg), and it can be known that the camera is swung in a direction of about 150 degrees with respect to the horizontal right direction.

Next, a method of setting a target position for subject tracking in the present embodiment will be described with reference to FIG. 11.

In the present embodiment, the target position is set such that the subject tracking is activated in the direction parallel to the swing direction α of the camera detected by shake detection unit 119, and the subject tracking is deactivated in the direction orthogonal to the swing direction α. By setting the target position based on the swing direction of the camera, the method of the present invention can be applied to the case of performing shooting while following a subject moving in an oblique direction.

Figure 11:
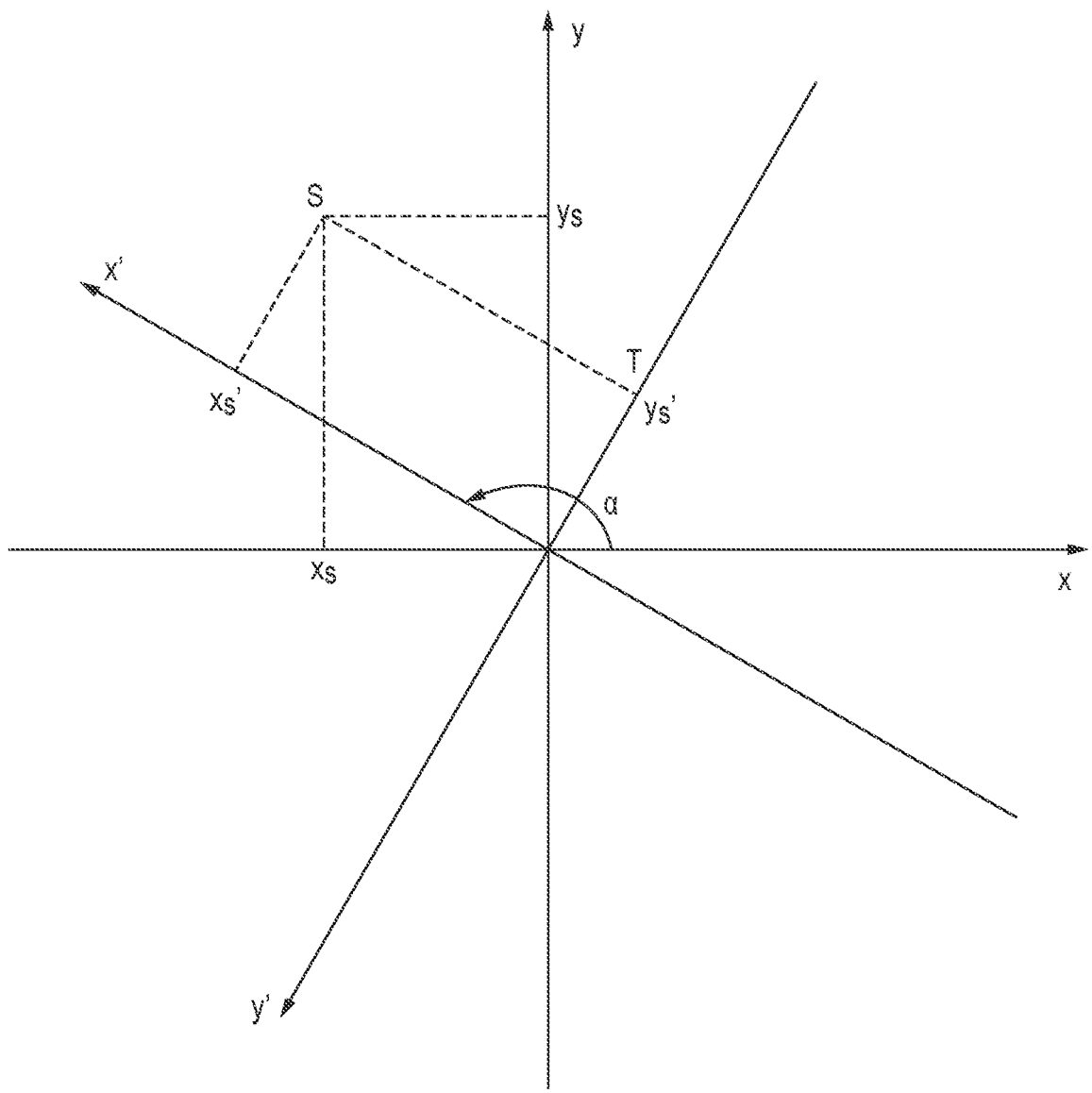
FIG. 11 is a diagram showing a position of a subject and a target position in the third embodiment.

Further, in FIG. 11, the subject position S and the target position T are shown in the image plane orthogonal to the optical axis direction as x-y. The subject position S is a position detected by the subject detection unit 127, and the coordinates of the subject position S are S=(xs, ys). The target position T is a position calculated by the target position setting unit 301 and set to the image stabilization control unit 302, and the coordinates of the target position T are T=(xt, yt). The target position T can be calculated from the swing direction α and the subject position S using the following equation (2).

$$T = \begin{bmatrix} x_t \\ y_t \end{bmatrix} = RT' = \begin{bmatrix} \cos\alpha & -\sin\alpha \\ \sin\alpha & \cos\alpha \end{bmatrix} \begin{bmatrix} 0 \\ y'_x \end{bmatrix} \quad (2)$$

$$S = \begin{bmatrix} x'_s \\ y'_s \end{bmatrix} = R^{-1}S = \begin{bmatrix} \cos\alpha & -\sin\alpha \\ -\sin\alpha & \cos\alpha \end{bmatrix} \begin{bmatrix} x_s \\ y_s \end{bmatrix}$$

T: Target position
S: Subject position
α: Swing direction
R: Rotation matrix
$R^{-1}$: Inverse of rotation matrix R is a rotation matrix that rotates the coordinates by the swing direction α, and $R^{-1}$ is an inverse of rotation matrix. The target position T can be calculated by rotationally transforming the subject position S by the swing direction α and then translating the subject position S in a direction parallel to the swing direction α.

First, the target position setting unit 301 calculates the subject position S'=(xs', ys') on the image plane x'-y' rotated by the swing direction α. Since the coordinates of the subject position S are the coordinates on the image plane x-y, the rotated subject position S' is obtained by rotating the subject position S by −α by the inverse of rotation matrix $R^{-1}$. Next, the target position setting unit 301 calculates the target position T' from the subject position S' so as to activate the subject tracking in the x' direction which is parallel to the swing direction α in the image plane x'-y', and deactivate the subject tracking in the y' direction. That is, the coordinates of the target position T' on the image plane x'-y' can be expressed as T'=(0, ys'). Finally, in order to convert the target position T' in the image plane x'-y' to the coordinates in the image plane x-y, the target position T' is rotated by being multiplied by the rotation matrix R, thereby the target position T which has undergone rotation conversion by α is calculated.

As described above, according to the third embodiment, the target position setting unit 301 calculates the swing direction in the image plane orthogonal to the optical axis from the swing angle detected by the shake detection unit 119, and the target position for subject tracking is set in the image stabilization control unit 302 based on the swing direction. As a result, it is possible to shoot an image of a subject with a composition with which the movement of the subject can be recognized even when the subject is moving in the oblique direction in the screen, and at the same time, it is possible to prevent the from going out of the screen.

Fourth Embodiment

Next, a fourth embodiment of the present invention will be described.

Figure 12:
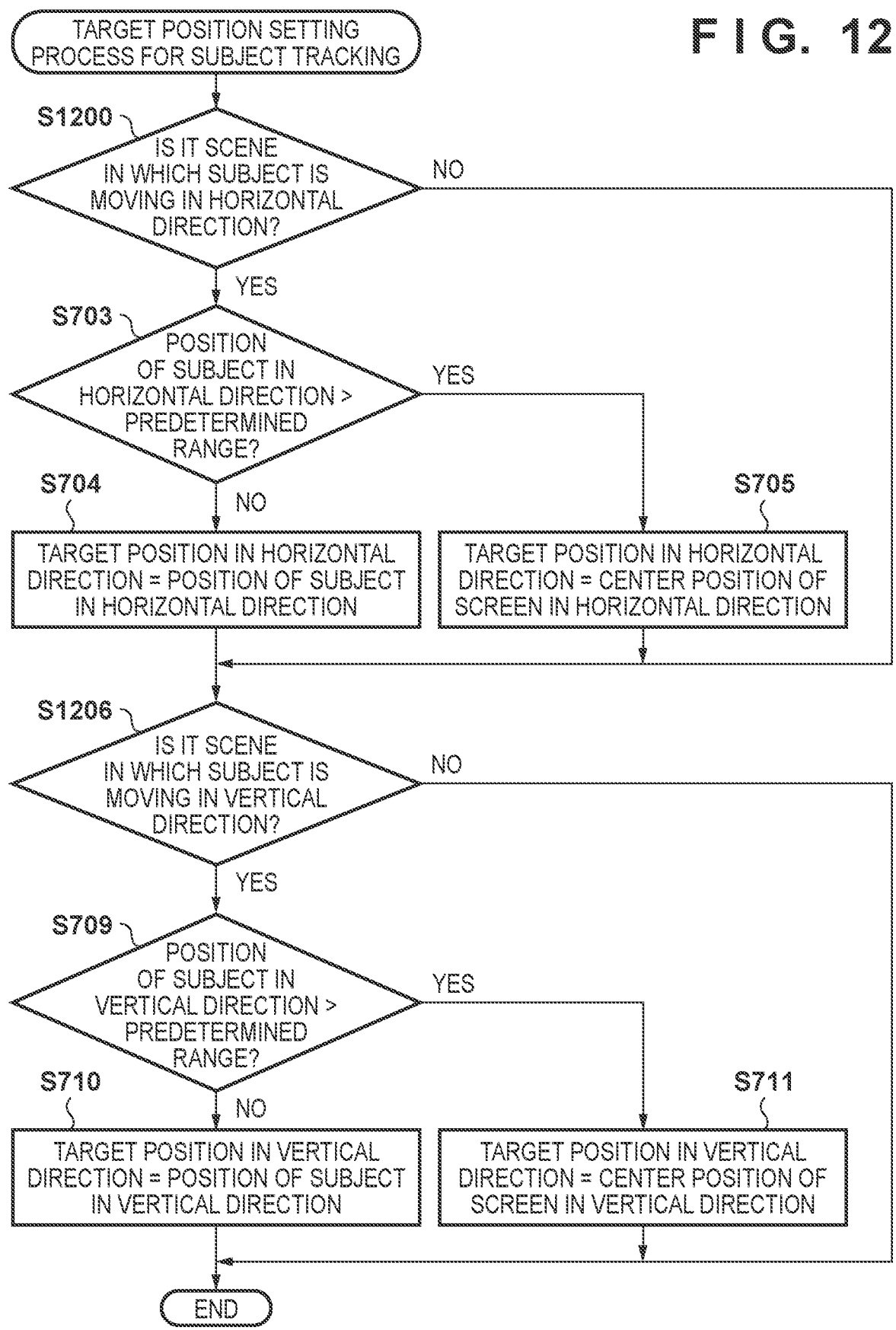
FIG. 12 is a flowchart illustrating a target position setting process for subject tracking according to a fourth embodiment.

FIG. 12 is a flowchart illustrating a target position setting process for subject tracking according to the fourth embodiment. In FIG. 12, the same processes such as that shown in FIG. 7 are assigned the same step numbers, and the description thereof will be omitted.

In the first embodiment, a case where the user selects a manual mode in which the target position at which a subject is to be tracked is set by the user or an auto mode in which the camera detects a framing operation and automatically sets the target position has been described. On the other hand, in the fourth embodiment, the shooting scene is determined based on the subject information acquired from the subject detection unit 127, and the tracking direction is selected.

Figure 7:
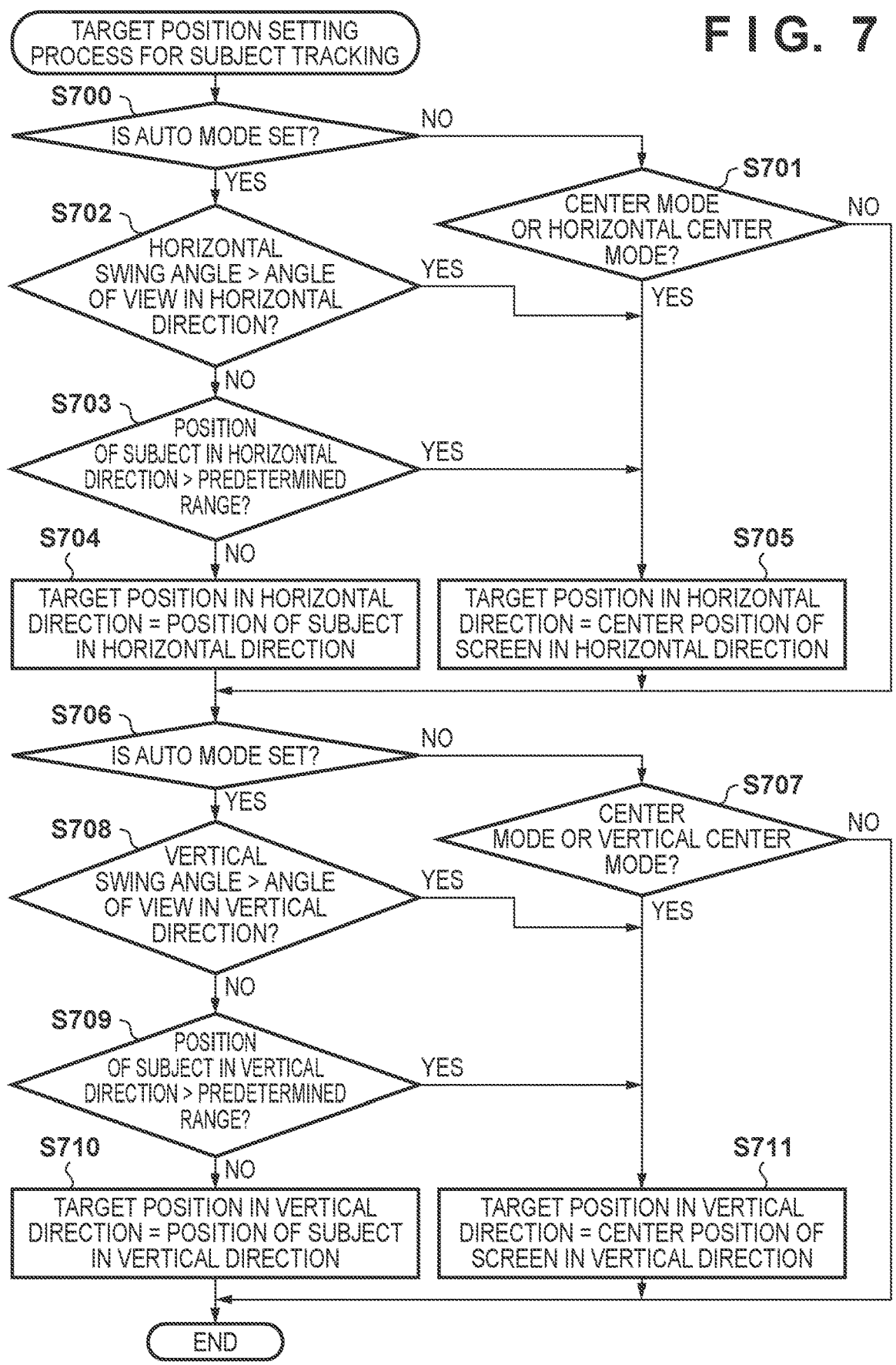
FIG. 7 is a flowchart illustrating a target position setting process for subject tracking according to the first embodiment.

In steps S700 to S702 in FIG. 7, the setting mode in the horizontal direction and the horizontal swing angle are determined, whereas in step S1200, it is determined whether or not the scene being shot is a scene for shooting a subject moving in the horizontal direction. For example, when a shooting scene is determined that a person is exhibiting a performance while moving in the horizontal direction such as figure skating or gymnastics, the subject tracking in the horizontal direction is activated and the subject tracking in the vertical direction is deactivated.

Similarly, in steps S706 to S708 in FIG. 7, the setting mode in the vertical direction and the vertical swing angle are determined, whereas in step S1206, it is determined whether or not the scene being shot is a scene for shooting a subject moving in the vertical direction. For example, when a shooting scene is determined as a competition aiming at a goal in the vertical direction while moving left and right, such as bouldering, the subject tracking in the vertical direction is activated and the subject tracking in the horizontal direction is deactivated.

As a method of determining a shooting scene, information such as subject information detected by the subject detection unit 127, subject motion vector detection result, shooting location, images shot in the past at the same location, shooting time, etc. is acquired from the camera and a cloud, and the shooting scene can be estimated by using a known scene recognition technique.

As described above, in the fourth embodiment, it is possible to automatically select the direction in which the subject tracking is activated by determining the shooting scene. As a result, the subject can be tracked and shot with a composition suitable for the shooting scene without the user selecting the modes for setting the target position.

Fifth Embodiment

Next, a fifth embodiment of the present invention will be described.

In the first embodiment, a case of setting a target position for subject tracking at the time of shooting has been described. On the other hand, in the fifth embodiment, a case of generating a tracking image by a cropping process after shooting will be described. By cropping a specific range of continuous images or moving image taken with a wide angle of view, it is possible to generate an enlarged image of the subject while retaining the movement of the subject.

In the present embodiment, the target position setting process for subject tracking described with reference to FIG. 7 in the first embodiment is applied to the setting process for setting the center position of trimming.

The camera control unit 120 stores in the memory 117 the swing angle acquired from the shake detection unit 119 at the time of shooting and the time when the angle is acquired. The image data recorded in the recording unit 116 is transferred to the image memory 108, and the subject detection unit 127 detects the subject position on the transferred image. Using this information, the target position for subject tracking is calculated by the same process as the setting process of FIG. 7.

The camera control unit 120 generates a cropped image centered on the calculated target position, and records the image in the recording unit 116 again. As for the swing angle, except for the method of storing it in the memory 117 at the time of shooting in advance, a method of calculating a motion vector from a moving image or continuous images and estimating the swing angle based on the motion vector information may be used. Further, the process of FIG. 9 or FIG. 12 may be applied to the target position setting process for subject tracking.

As described above, in the fifth embodiment, by applying the target position setting process for subject tracking to the cropping process during reproduction, it is possible to generate an image having the same effect such as that obtained by performing the target position setting process for subject tracking during shooting. As a result, it is possible to generate an enlarged image of the subject from the captured moving image or the continuous images, and it is also possible to automatically generate an image having a composition with which the movement of the subject can be recognized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-230627, filed on Dec. 20, 2019, and 2020-186051, filed on Nov. 6, 2020, which are hereby incorporated by reference herein in their entirety.

What is claimed is:

1. A tracking apparatus comprising:
a detection unit that detects a subject in an image obtained by photoelectrically converting light entering through an imaging optical system with an image sensor;
a tracking control unit that is capable of controlling the subject tracking in a plurality of predetermined directions by performing at least one of controlling moving of an image stabilization lens, moving of the image sensor and reading out part of the image based on a position of the subject; and
a determination unit that determines a tracking direction in which the subject is to be tracked among the plurality of directions,
wherein the tracking control unit controls the subject tracking so that the subject tracking is performed in the tracking direction and the subject tracking is supressed in a direction different from the tracking direction,
wherein each unit is implemented by one or more processors, circuitry or a combination thereof.

2. The tracking apparatus according to claim 1 further comprising an operation unit used to designate one of the plurality of directions as the tracking direction,
wherein the determination unit determines the tracking direction designated by the operation unit, and
wherein the operation unit is implemented by one or more processors, circuitry or a combination thereof.

3. The tracking apparatus according to claim 2, wherein the plurality of directions are a first direction and a second direction which is orthogonal to the first direction.

4. The tracking apparatus according to claim 1 further comprising a shake detection unit that detects an amount of shake of the tracking apparatus in each of the plurality of directions, wherein the determination unit
obtains an angle of shake in each of the plurality of directions based on the amount of shake, and
determines a direction of the plurality of directions in which the angle of shake is larger than a threshold determined for each of the plurality of directions as the tracking direction, and
wherein the shake detection unit is implemented by one or more processors, circuitry or a combination thereof.

5. The tracking apparatus according to claim 4, wherein the determination unit
obtains an angle of view of the image based on a focal length of the imaging optical system, and
sets the threshold based on the angle of view.

6. The tracking apparatus according to claim 4, wherein the tracking control unit activates the tracking in a direction of the plurality of directions in which the angle of shake is equal to or smaller than the threshold and the position of the subject in the image is beyond a range determined for each of the plurality of directions in advance.

7. The tracking apparatus according to claim 1 further comprising a shake detection unit that detects an amount of shake of the tracking apparatus in each of the plurality of directions,
wherein the determination unit
obtains an angle of shake in each of the plurality of directions based on the amount of shake, and
detects the tracking direction based on a ratio between the angles of shake in the plurality of directions, and
wherein the shake detection unit is implemented by one or more processors, circuitry or a combination thereof.

8. The tracking apparatus according to claim 1, wherein the tracking control unit controls the subject tracking by
setting a target position of the subject in the tracking direction at center of the image in the tracking direction, and
setting the target position of the subject in a direction other than the tracking direction at a position of the subject in the image.

9. The tracking apparatus according to claim 1, wherein the tracking control unit control the subject tracking by decreasing a control value in a direction other than the tracking direction.

10. The tracking apparatus according to claim 1, further comprising at least either of
a lens moving unit that moves the image stabilization lens included in the imaging optical system in a plane orthogonal to an optical axis of the imaging optical system, and
a sensor moving unit that moves the image sensor in a plane orthogonal to the optical axis of the imaging optical system.

11. The tracking apparatus according to claim 1 further comprising a memory that stores the image,
wherein the tracking control unit controls the subject tracking by controlling a position of an area corresponding to the part of the image to be read out from the memory based on the position of the subject.

12. The tracking apparatus according to claim 1 further comprising a scene detection unit that detects a shooting scene,
wherein the determination unit determines the tracking direction according to the shooting scene detected by the scene detection unit, and
wherein the scene detection unit is implemented by one or more processors, circuitry or a combination thereof.

13. The tracking apparatus according to claim 1, wherein the tracking control unit tracks the subject by performing reading out the part of the image and enlarging the part of the image and outputting the enlarged part of the image.

14. The tracking apparatus according to claim 1, wherein the tracking control unit control the subject tracking in a direction different from the tracking direction by setting a gain so that a control value for the direction different from the tracking direction is smaller than a difference between a target position and the position of the subject.

15. An image capturing apparatus comprising:
an image sensor configured to photoelectrically convert light entering through an imaging optical system and output an image; and
a tracking apparatus comprising:
a detection unit that detects a subject in the image;
a tracking control unit that is capable of controlling the subject tracking in a plurality of predetermined directions by performing at least one of controlling moving of an image stabilization lens, moving of the image sensor and reading out part of the image based on a position of the subject; and
a determination unit that determines a tracking direction in which the subject is to be tracked among the plurality of directions,
wherein the tracking control unit controls the subject tracking so that the subject tracking is performed in the tracking direction and the subject tracking is suppressed in a direction different from the tracking direction,
wherein each unit is implemented by one or more processors, circuitry or a combination thereof.

16. The image capturing apparatus according to claim 15 further comprising the imaging optical system.

17. A control method of a tracking apparatus having a tracking control unit that is capable of controlling subject tracking in a plurality of predetermined directions by performing at least one of controlling moving of an image stabilization lens, moving of the image sensor and reading out part of the image based on a position of the subject, the method comprising:
detecting a subject in an image obtained by photoelectrically converting light entering through an imaging optical system;
determining a tracking direction in which the subject is to be tracked among the plurality of directions; and
controlling, with the tracking control unit, to control the subject tracking so that the subject tracking is performed in the tracking direction and the subject tracking is suppressed in a direction different from the tracking direction.

18. A non-transitory computer-readable storage medium, the storage medium storing a program that is executable by the computer, wherein the program includes program code for causing the computer to execute a control method of a tracking apparatus having a tracking control unit that is capable of controlling subject tracking in a plurality of predetermined directions by performing at least one of controlling moving of an image stabilization lens, moving of the image sensor and reading out part of the image based on a position of the subject, comprising:
detecting a subject in an image obtained by photoelectrically converting light entering through an imaging optical system; and
determining a tracking direction in which the subject is to be tracked among the plurality of directions, wherein the tracking control unit controls the subject tracking so that the subject tracking is performed in the tracking direction and the subject tracking is suppressed in a direction different from the tracking direction.

19. A tracking apparatus comprising:

a detection unit that detects a subject in an image obtained by photoelectrically converting light entering through an imaging optical system with an image sensor;

a tracking control unit that is capable of setting an angle of view to track the subject in a plurality of predetermined directions;

a determination unit that determines a tracking direction in which the subject is to be tracked among the plurality of directions, wherein the tracking control unit controls the subject tracking so that the subject tracking is performed in the tracking direction and the subject tracking is suppressed in a direction different from the tracking direction, wherein each unit is implemented by one or more processors, circuitry or a combination thereof.

* * * * *